United States Patent
Cervantez

(10) Patent No.: US 11,138,311 B2
(45) Date of Patent: Oct. 5, 2021

(54) DISTRIBUTED SECURITY INTROSPECTION

(71) Applicant: Salesforce.com, Inc., San Francisco, CA (US)

(72) Inventor: Michael Cervantez, San Francisco, CA (US)

(73) Assignee: salesforce.com, Inc., San Francisco, CA (US)

(*) Notice: Subject to any disclaimer, the term of this patent is extended or adjusted under 35 U.S.C. 154(b) by 175 days.

(21) Appl. No.: 16/193,842

(22) Filed: Nov. 16, 2018

(65) Prior Publication Data

US 2020/0159917 A1    May 21, 2020

(51) Int. Cl.
*G06F 21/55* (2013.01)
*G06F 21/56* (2013.01)
*G06N 7/00* (2006.01)
*G06N 20/00* (2019.01)

(52) U.S. Cl.
CPC .......... *G06F 21/554* (2013.01); *G06F 21/562* (2013.01); *G06N 7/005* (2013.01); *G06N 20/00* (2019.01); *G06F 2221/033* (2013.01)

(58) Field of Classification Search
CPC ............... G06F 21/1554; G06F 21/562; G06F 2221/033; G06N 7/005; G06N 20/00
USPC .......................................................... 726/23
See application file for complete search history.

(56) References Cited

U.S. PATENT DOCUMENTS

| | | | |
|---|---|---|---|
| 8,352,941 B1 | 1/2013 | Protopopov et al. | |
| 8,805,951 B1 | 8/2014 | Faibish et al. | |
| 10,409,995 B1* | 9/2019 | Wasiq | G06N 20/00 |
| 2011/0078650 A1* | 3/2011 | Weber | G06Q 10/06 717/104 |
| 2013/0340077 A1 | 12/2013 | Salsamendi et al. | |
| 2014/0115578 A1 | 4/2014 | Cooper et al. | |
| 2016/0373481 A1* | 12/2016 | Sultan | G06F 21/554 |
| 2020/0159912 A1 | 5/2020 | Cervantez | |

OTHER PUBLICATIONS

U.S. Appl. No. 16/193,816, Non-Final Rejection, dated Nov. 18, 2020, 14 pgs.
U.S. Appl. No. 16/193,816, Examiner Interview Summary dated Jan. 26, 2021, 3 pgs.

\* cited by examiner

*Primary Examiner* — Jeffrey C Pwu
*Assistant Examiner* — Nega Woldemariam
(74) *Attorney, Agent, or Firm* — Kwan & Olynick LLP

(57) ABSTRACT

A graph representation of a designated application may be created. The graph representation may include nodes that each represent a computer programming code statement associated with the designated application as well as edges that each represent a logical linkage between two or more computer programming code statements. A determination may be made as to whether the designated application constitutes an unacceptable security risk by comparing the designated graph representation with a plurality of comparison graph representations. When it is determined that the designated application constitutes an unacceptable security risk, a message may be transmitted to prevent the designated application from being executed.

17 Claims, 8 Drawing Sheets

DISTRIBUTED SECURITY INTROSPECTION

FIELD OF TECHNOLOGY

This patent document relates generally to application security evaluation and more specifically to distributed techniques for profiling external applications executed in an on-demand computing services environment.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Many cloud computing environments execute applications written by other entities. For example, such applications may be written by customers of the cloud computing environment or by third party entities writing such applications for customers. Security is of paramount importance in many cloud computing environments. However, conventional techniques do not secure cloud computing environments against the exposure of private data or other deleterious consequences of malicious or defective external applications.

BRIEF DESCRIPTION OF THE DRAWINGS

The included drawings are for illustrative purposes and serve only to provide examples of possible structures and operations for the disclosed inventive systems, apparatus, methods and computer program products for the security evaluation of external applications. These drawings in no way limit any changes in form and detail that may be made by one skilled in the art without departing from the spirit and scope of the disclosed implementations.

DETAILED DESCRIPTION

Figure 1:
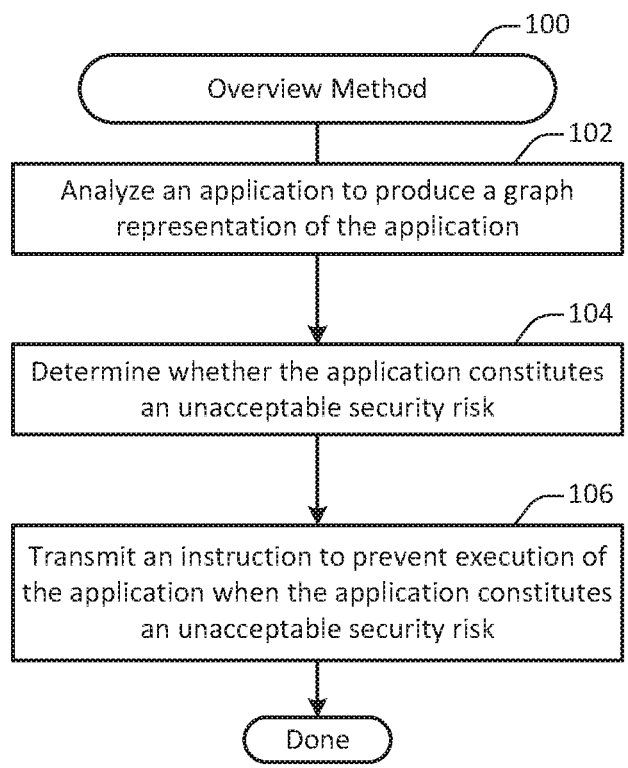
FIG. 1 illustrates an example of an overview method, performed in accordance with one or more embodiments.

Cloud providers operate application exchanges/stores for customers to download and execute their software either on a customer-owned device or in the "cloud" in a shared security model. However, customers expect that software that is deployed in the "cloud" in a server-less oriented architecture should be secure when running the package in their own cloud instance of the environment, regardless if the package was created by the service provider or third-party. As more cloud providers move to offer serverless-oriented services, improved techniques are desired for keeping keep customer and service provider data and intellectual property safe & secure.

According to various embodiments, techniques and mechanisms described herein provide for the dynamic detection of malicious or erroneous computer programming code in an on-demand computing services environment. For example, in the on-demand computing service environment, malicious code that is not caught may harvest user data without adequate user consent and exploit that data directly or transmit it to a remote location for exploitation in the future. Such problems are particularly prevalent in application exchange systems in which third-parties can supply software for customers of an on-demand computing service environment to execute in the on-demand computing service environment. However, according to techniques and mechanisms described herein, such problems may be detected in advance and their consequences averted.

According to various embodiments, the system may dynamically perform process code introspection on a virtual machine in order to gain telemetry and function hooks that can be used to detect and mitigate information disclosure, unsafe function calls, and security events as code is executing on the virtual machine. For example, the system may analyze the function calls and package import statements to produce a graph representation of the application. The scoring system may maintain a library of application information to determine if a current version of an application includes one or more code portions predicted to behave in a way that is either unfavorable for package customers or the infrastructure service provider. When a threshold is reached using machine learning, heuristics, and/or probabilistic models, the scoring system can then update a function call pattern blacklist to mitigate the potential information disclosures, unsafe function calls, or other security events.

As an example, consider a company Acme Corp. In order to take advantage of updated data management techniques, Acme receives on-demand computing services provided by Modern Corp. Modern provides a full-featured on-demand computing services environment, including services for communication, sales lead management, customer relations management, service management, and training. For instance, Acme uses Modern services to manage information about Acme's sales leads, customers, and products. Employing these services allows Acme to focus on Acme's business rather than on maintaining and developing computing infrastructure.

As part of Modern's system, clients may run applications to perform operations related to data stored by Modern. For example, Acme runs applications to analyze sales leads, supplement incomplete data records, automatically communicate with customers, and perform other such operations. Although Modern supplies some such applications, Modern's clients may also employ their own customized applications, which may be written by Modern's clients or by third-party application developers.

Acme employs its own application developers to develop a Modern application to communicate with customers. In the past, Acme's customer communication application has performed flawlessly, sending a few hundred customer messages per day. However, in the most recent version, Acme's developers introduced an error causing the application to inadvertently transmit unwanted communications to all of Acme's customers at once.

Acme also purchases an application from a third-party developer Fishy Corp. to supplement missing data in client records. In the past, Fishy's application has retrieved a small amount of Acme's data, used the retrieved data to identify missing information such as customer contact data, and then updated Acme's data with the identified information. However, Fishy recently updated the application to include computer programming code that may appear to be innocuous upon manual inspection but that actually maliciously retrieves all of Acme's customer records and sends them to an external server for exploitation.

Although Modern has many in place many security precautions, it does not manually check each and every line of code submitted in a third-party or client-supplied application. Moreover, manual inspection may fail to detect computer programming code errors or (potentially obfuscated) malicious computer programming code. Accordingly, conventional techniques may fail to prevent the transmission of the unwanted communications caused by Acme's error as well as the unauthorized retrieval and exploitation of data caused by Fishy's malicious computer programming code.

According to various embodiments, techniques and mechanisms described herein may facilitate the detection of erroneous and/or malicious computer programming code. For example, the system may analyze the function calls, package import statements, and other code to produce a graph representation of the application. If the graph representation of the application exhibits features predictive of unacceptable behavior, then the execution of the application may be prohibited. For example, the system may determine that an updated version of an application unexpectedly makes an excessive number of function calls to retrieve private data. As another example, the system may determine that an updated version of an application makes a function call to transmit data to a remote location when past versions of the application included no such transmission function calls.

According to various embodiments, information related to delayed instructions may be evaluated determine whether the execution of the instructions is permissible. Such a determination may be made based on any suitable criteria, such as predefined rules, the past behavior of the application, or the past behavior of other applications. For example, an application that retrieves, edits, or sends an excessive amount of data or unexpected types of data as compared to similar applications or previous versions of the same application may be scored as potentially impermissible. Then, such operations may be halted before data is updated within the on-demand computing service environment or transmitted outside the on-demand computing service environment.

In the example discussed above, the graph representation of Acme's updated application would not have matched the representation of previous versions, which the scoring system would flag as potentially impermissible. Similarly, in the example discussed above, the updated version of Fishy's application would be flagged as potentially impermissible based on an unexpected number or type of data retrieval operations in comparison with previous versions of the application. Accordingly, both the unwanted communications caused by Acme's error and the exploitation of data caused by Fishy's code would be averted.

FIG. 1 illustrates an example of an overview method 100, performed in accordance with one or more embodiments. According to various embodiments, the method 100 may be performed at one or more components within an on-demand service environment such as the environments discussed with respect to FIGS. 2, 3, 4A, and 4B.

At 102, an application is analyzed to produce a graph representation of the application. According to various embodiments, the graph representation may represent aspects of the application that may include, but are not limited to: logical program flow control, communication with network addresses outside the virtual machine on which the application would be executed, data retrieved or modified from within the on-demand computing services environment, libraries or packages imported, functions called, and instances where functions or libraries are determined dynamically at runtime.

In some implementations, the graph representation may be constructed at least in part by simulating the execution of the application. For example, the application may include computer programming code flow control instructions such as an "if" statement. Although evaluation of the "if" statement may not be possible without data determined at runtime, the presence of the "if" statement creates a logical branching that may be mapped in the graph representation. As another example, the application may include computer programming code that imports a particular package and then executions a function included in that package. The package and function may then be included in the graph representation. Additional details regarding the construction of a graph representation are discussed elsewhere herein, such as with respect to the representation 600 shown in FIG. 6 and the method 500 shown in FIG. 5.

At 104, a determination is made as to whether the application constitutes an unacceptable security risk. According to various embodiments, the application may be evaluated at least in part by a scoring engine based on the graph representation determined at 102.

In some implementations, the application may be evaluated by comparing the graph representation constructed at operation 102 to information about other applications in the on-demand computing services environment. For example, the focal application's procedure calls, library import statements, and other such operations may be compared to those of other applications to identify whether the focal application is abnormal.

According to various embodiments, the application may be evaluated by comparing the graph representation constructed at operation 102 to information about previous versions of the same application. For example, if the current version of the application includes operations substantially dissimilar to previous versions, such as an unusual number of data record retrieval requests or evidence of unusual communication with outside recipients, the current version may be identified as having an unacceptable risk.

At 106, when the application constitutes an unacceptable security risk, execution of the application is preventing. In some embodiments, preventing the execution of the application may involve failing to sending an instruction to prevent the instantiation of the application. Alternately, or additionally, an instruction may be sent to halt any instances of the application that have already been initiated.

In some implementations, preventing execution of the application may involve transmitting a notification message. For example, an email message or other communication may be sent to the customer associated with the instance of the application. As another example, a system administrator may be notified.

In some embodiments, halting further execution of the application may involve any of a variety of operations for preventing harm. These may include, but are not limited to: disabling the application in an application exchange, uninstalling the application from virtual machine instances or other contexts, alerting customers who may have been affected by the problem, and/or blocking access to the application. Additional details regarding the evaluation of an application and the prevention of further execution are discussed elsewhere herein, such as with respect to the method 700 shown in FIG. 7.

Figure 2:
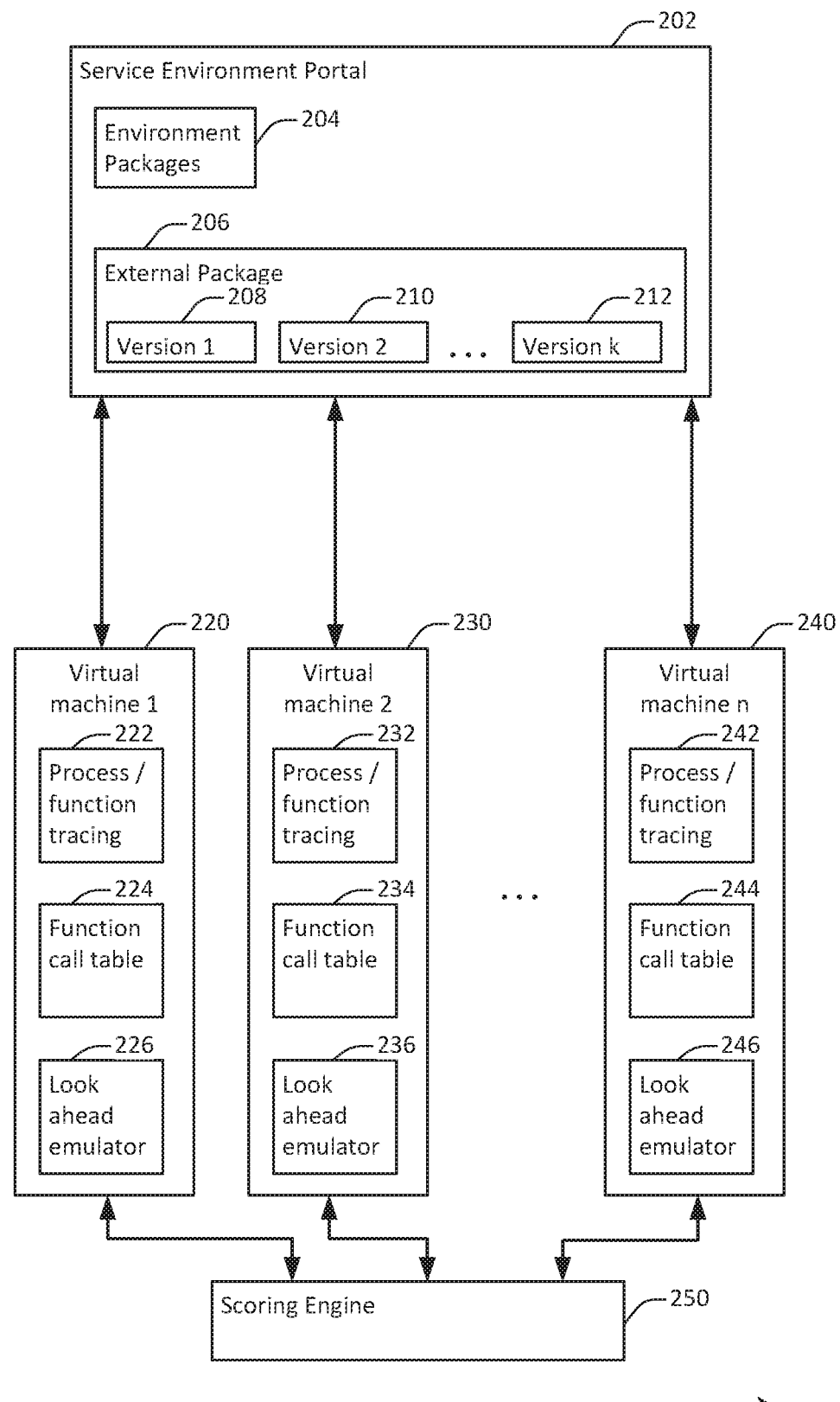
FIG. 2 illustrates an example of a system architecture, configured in accordance with one or more embodiments.

FIG. 2 illustrates an example of a system architecture 200, configured in accordance with one or more embodiments. According to various embodiments, the system architecture 200 may be employed to perform some or all of the operations discussed herein, including those discussed with respect to FIGS. 1, 5, and 6. The system architecture 200 may be composed of one or more components within an on-demand computing service environment. Additional details about on-demand computing service environments are discussed with respect to the architectures shown in FIGS. 3, 4A, and 4B.

The system architecture 200 includes a service environment portal 202, which includes environment packages 204 and an external package 206. In some embodiments, the environment packages 204 may include any computer programming code provided by the on-demand service provider. For example, 204 environment packages 204 may include standard classes, functions, or APIs for interacting with the service environment. As another example, the environment packages 204 may include computer programming code that embodies business logic for commonly encountered situations. B According to various embodiments, the service environment portal 202 provides an interface through which clients may interact with the on-demand computing service environment. For example, a client may communicate with the service environment portal 202 to instantiate one or more copies of an application to run within a virtual machine within the on-demand computing service environment. Such an application may be used to analyze, update, and/or retrieve data stored within the on-demand computing service environment.

The environment packages 204 are authored by the service provider 204 and therefore highly unlikely to contain malicious computer programming code. Accordingly, in particular embodiments the execution of the environment packages 204 need not be evaluated via lookahead execution and process/function tracing. However, the environment packages 204 may nevertheless contain errors that cause the code to perform unexpectedly. Accordingly, in some implementations the execution of one or more of the environment packages 204 may be dynamically evaluated.

The external package 206 is authored by an entity outside the on-demand computing service environment and not under the direct control of the computing environment service provider. For example, the external package 206 may be authored by a client of the on-demand computing service environment. Alternately, the external package 206 may be authored by a third-party developer and provided to the client for the client's use. Such a third-party developer may provide computer programming code directly to a client or may provide computer programming code to multiple clients through an application exchange. Although only one third-party package is shown in FIG. 2, a service environment portal may contain any number of (and potentially man) external packages.

The external package 206 includes multiple versions, including the versions 208, 210, and 212. According to various embodiments, a version may be a successive updating of the external package 206, for instance to add new features or eliminate errors in the computer programming code. Alternately, or additionally, a version may be a customized edition of the external package 206. Each version may be provided by the developer of the external package. Accordingly, a malicious developer may insert malicious computer programming code into a version of the external package 206 even if the malicious computer programming code was not present in a different or previous version. Similarly, one version of the external package 206 may include erroneous or buggy code, while another version may not.

The system architecture 200 also includes virtual machines 220, 230, and 240. According to various embodiments, each virtual machine may be configured to execute computer programming code in associate with a client of the on-demand computing service environment. For example, a client may instantiate one or more applications, which may be run in one or more virtual machines. A virtual machine may be configured as an application server, such as the application server 350 discussed with respect to FIG. 3.

Each virtual machine includes a process/function tracing module such as the modules 222, 232, and 242. According to various embodiments, a process/function tracing module is configured to facilitate look ahead execution of computer programming code. For example, a process/function tracing module may identify upcoming instructions in computer programming code that have not yet been executed but are likely to be executed in the future.

In some embodiments, the process/function tracing module may identify upcoming instructions by tracing process execution and function calls. For example, computer code may branch in execution due to "if" statements, "switch" statements, "for" loops, "while" loops, and other such control commands. The process/function tracing module may use data values stored in memory to predict which branch of such control commands may be followed. Alternately, the process/function tracing module may follow more than one potential branch of code, particularly if data stored in memory does not permit deterministic or sufficiently accurate probabilistic prediction of branching execution.

As another example, computer code drawn from one class or file may import computer code drawn from another class or file by way of function calls. The process/function tracing module may perform such importing in advance by analyzing a function call before it is executed to identify operations performed by the imported code.

According to various embodiments, the process/function tracing module may use techniques such as branch prediction and function tracing to identify operations that are likely to be performed in the future by the computer programming code. These operations may then be used to evaluate whether the computer programming code is likely to perform operations that are not permitted.

Each virtual machine includes a function call table such as the function call tables 224, 234, and 244. In some embodiments, the function call tables may maintain records of actual or predicted function calls performed by the application or applications running within the virtual machines. Each entry in the function call table may identify a function called by an application. The function call table may also include information about the parameter values passed to the function.

In particular embodiments, the function call table may be used to determine the actual function called in a dynamic dispatch or run-time method binding scenario. For instance, in some computer programming code the function being called is determined dynamically at runtime based on information determined during the execution of the code. The function call table may contain the addresses of an object's dynamically bound methods. As discussed with respect to the process/function tracing module, such information may be dynamically determined in advance of its execution via process tracing and/or function tracing. Such information may then be stored in the function call table.

Each virtual machine includes a look ahead emulator such as the emulators 226, 236, and 246. According to various embodiments, the look ahead emulator may be configured to emulate the execution of computer programming code in advance of actual execution. Look ahead emulation may involve executing operations via clock skewing. Under clock skewing, the virtual machine executes operations in the virtual environment in advance of when those operations take effect outside of the virtual machine. That is, the virtual machine may enforce a positive lag between the virtual environment and the external environment.

In some embodiments, the lookahead execution may involve immediately executing operations that have only local effect. For example, operations such as retrieving data from an external source or from the on-demand computing service environment do not change the external environment. As another example, operations such as analyzing data or updating values within the virtual environment similarly do not change the external environment. However, operations that have external effects may be delayed for analysis. Such operations may include, but are not limited to, those that involve transmitting data to a location outside the on-demand computing service environment and those that involve updating data stored within the on-demand computing service environment but outside the virtual environment, such as within a database.

According to various embodiments, because the virtual machine is employing clock skewing, a lag exists between encountering an operation that updates the external environment and the time at which the operation is actually executed. That time gap may then be used to determine whether the operation should actually be executed or should instead be halted. Techniques for lookahead execution are discussed in further detail with respect to FIG. 5.

The system architecture 200 also includes the scoring engine 250. According to various embodiments, the scoring engine 250 may construct a graph representation of an application. The scoring engine 250 may also analyze the graph representation to determine whether the application constitutes a security risk.

According to various embodiments, the scoring engine 250 may be configured to receive and analyze information from the virtual machines during lookahead execution. The scoring engine 250 may apply one or more types of analysis to determine whether to halt the lookahead execution. Such techniques may include, but are not limited to: machine learning models, probabilistic models, predetermined rules, and heuristic rules. Techniques for evaluating information identified through lookahead execution are discussed in further detail with respect to FIG. 6.

In some embodiments, the scoring engine 250 may be implemented within a virtual machine. Alternately, or additionally, the scoring engine 250 may be implemented in a distributed fashion. For example, an on-demand computing services environment may include one, two, or potentially many scoring engines working independently or in concert to evaluate applications.

Figure 3:
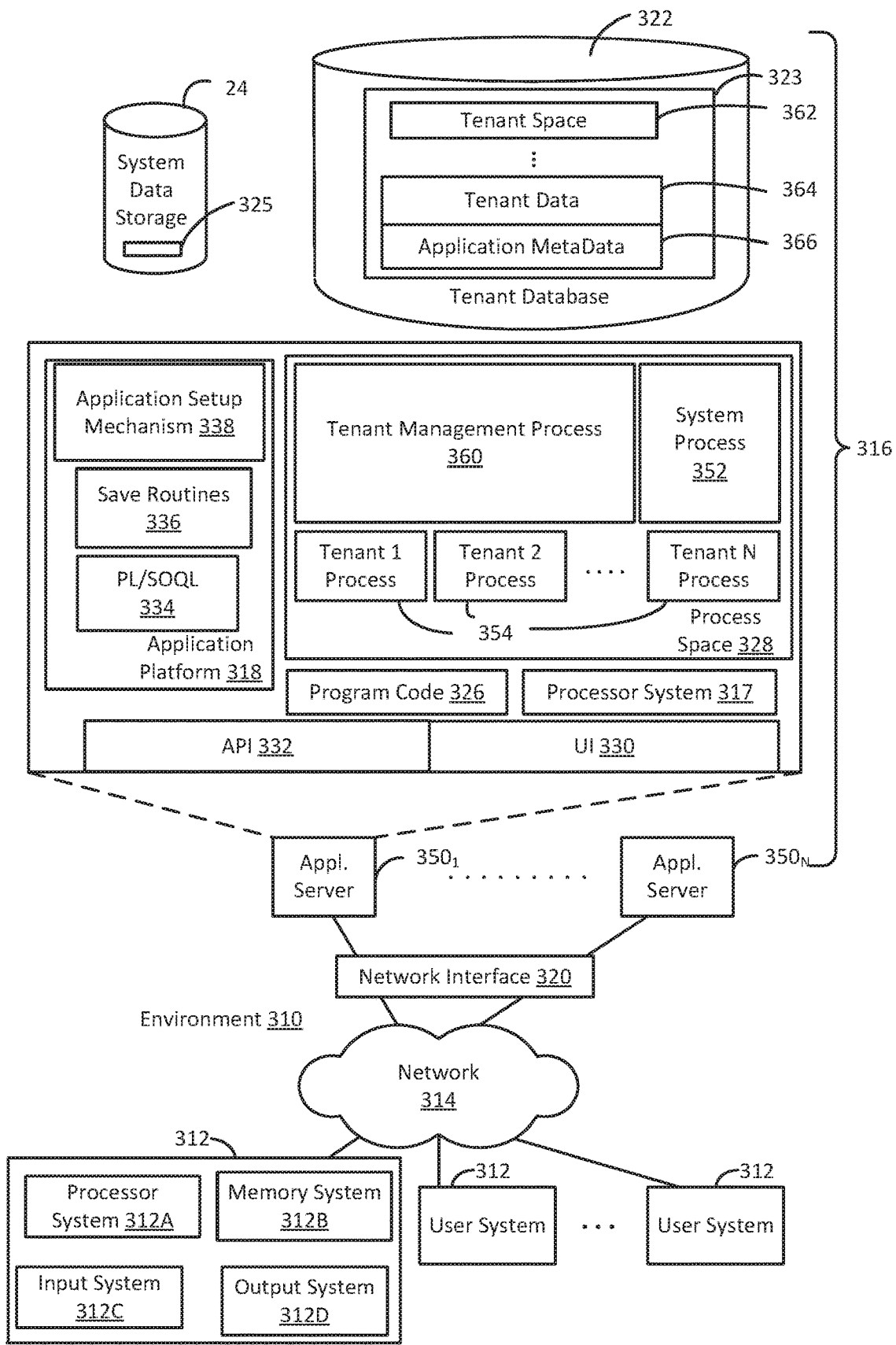
FIG. 3 shows a block diagram of an example of an environment that includes an on-demand database service configured in accordance with some implementations.

FIG. 3 shows a block diagram of an example of an environment 310 that includes an on-demand database service configured in accordance with some implementations. Environment 310 may include user systems 312, network 314, database system 316, processor system 317, application platform 318, network interface 320, tenant data storage 322, tenant data 323, system data storage 324, system data 325, program code 326, process space 328, User Interface (UI) 330, Application Program Interface (API) 332, PL/SOQL 334, save routines 336, application setup mechanism 338, application servers 350-1 through 350-N, system process space 352, tenant process spaces 354, tenant management process space 360, tenant storage space 362, user storage 364, and application metadata 366. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 316, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 316. Such applications may be developed by the database service provider or by users or third-party application developers accessing the service. Application platform 318 includes an application setup mechanism 338 that supports application developers' creation and management of applications, which may be saved as metadata into tenant data storage 322 by save routines 336 for execution by subscribers as one or more tenant process spaces 354 managed by tenant management process 360 for example. Invocations to such applications may be coded using PL/SOQL 334 that provides a programming language style interface extension to API 332. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 366 for a subscriber making such an invocation. Such system processes may also manage execution of application metadata 366 as an application in a virtual machine.

In some implementations, each application server 350 may handle requests for any user associated with any organization. A load balancing function (e.g., an F5 Big-IP load balancer) may distribute requests to the application servers 350 based on an algorithm such as least-connections, round robin, observed response time, etc. Each application server 350 may be configured to communicate with tenant data storage 322 and the tenant data 323 therein, and system data storage 324 and the system data 325 therein to serve requests of user systems 312. The tenant data 323 may be divided into individual tenant storage spaces 362, which can be either a physical arrangement and/or a logical arrangement of data. Within each tenant storage space 362, user storage 364 and application metadata 366 may be similarly allocated for each user. For example, a copy of a user's most recently used (MRU) items might be stored to user storage 364. Similarly, a copy of MRU items for an entire tenant organization may be stored to tenant storage space 362. A UI 330 provides a user interface and an API 332 provides an application programming interface to system 316 resident processes to users and/or developers at user systems 312.

System 316 may implement a web-based portal system. For example, in some implementations, system 316 may include application servers configured to implement and execute software applications in virtual machines. The application servers may be configured to provide related data, code, forms, web pages and other information to and from user systems 312. Additionally, the application servers may be configured to store information to, and retrieve information from a database system. Such information may include related data, objects, and/or Webpage content. With a multi-tenant system, data for multiple tenants may be stored in the same physical database object in tenant data storage 322, however, tenant data may be arranged in the storage medium(s) of tenant data storage 322 so that data of one tenant is kept logically separate from that of other tenants. In such a scheme, one tenant may not access another tenant's data, unless such data is expressly shared.

Several elements in the system shown in FIG. 3 include conventional, well-known elements that are explained only briefly here. For example, user system 312 may include processor system 312A, memory system 312B, input system 312C, and output system 312D. A user system 312 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 312 to access, process and view information, pages and applications available from system 316 over network 314. Network 314 may be any network or combination of networks of devices that communicate with one another, such as any one or any combination of a LAN (local area network), WAN (wide area network), wireless network, or other appropriate configuration.

The users of user systems 312 may differ in their respective capacities, and the capacity of a particular user system 312 to access information may be determined at least in part by "permissions" of the particular user system 312. As discussed herein, permissions generally govern access to computing resources such as data objects, components, and other entities of a computing system, such as a social networking system, a CRM database system, and/or other applications running within a virtual machine. "Permission sets" generally refer to groups of permissions that may be assigned to users of such a computing environment. For instance, the assignments of users and permission sets may be stored in one or more databases of System 316. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 316 may provide on-demand database service to user systems 312 using an MTS arrangement. By way of example, one tenant organization may be a company that employs a sales force where each salesperson uses system 316 to manage their sales process. Thus, a user in such an organization may maintain contact data, leads data, customer follow-up data, performance data, goals and progress data, etc., all applicable to that user's personal sales process (e.g., in tenant data storage 322). In this arrangement, a user may manage his or her sales efforts and cycles from a variety of devices, since relevant data and applications to interact with (e.g., access, view, modify, report, transmit, calculate, etc.) such data may be maintained and accessed by any user system 312 having network access.

When implemented in an MTS arrangement, system 316 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 316 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 316 may also maintain system-level data usable by multiple tenants or other data. Such system-level data may include industry reports, news, postings, and the like that are sharable between tenant organizations.

In some implementations, user systems 312 may be client systems communicating with application servers 350 to request and update system-level and tenant-level data from system 316. By way of example, user systems 312 may send one or more queries requesting data of a database maintained in tenant data storage 322 and/or system data storage 324. An application server 350 of system 316 may automatically generate one or more SQL statements (e.g., one or more SQL queries) that are designed to access the requested data. System data storage 324 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 4A:
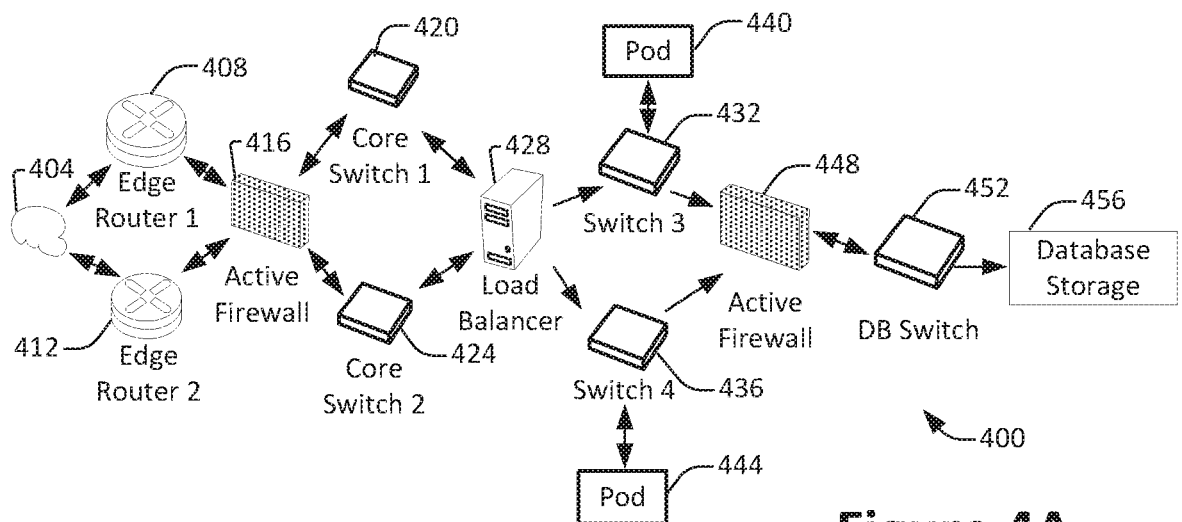
FIG. 4A shows a system diagram of an example of architectural components of an on-demand database service environment, configured in accordance with some implementations.

FIG. 4A shows a system diagram of an example of architectural components of an on-demand database service environment 400, configured in accordance with some implementations. A client machine located in the cloud 404 may communicate with the on-demand database service environment via one or more edge routers 408 and 412. A client machine may include any of the examples of user systems ?12 described above. The edge routers 408 and 412 may communicate with one or more core switches 420 and 424 via firewall 416. The core switches may communicate with a load balancer 428, which may distribute server load over different pods, such as the pods 440 and 444 by communication via pod switches 432 and 436. The pods 440 and 444, which may each include one or more servers and/or other computing resources, may perform data processing and other operations used to provide on-demand services. Components of the environment may communicate with a database storage 456 via a database firewall 448 and a database switch 452.

Accessing an on-demand database service environment may involve communications transmitted among a variety of different components. The environment 400 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 4A and 4B.

The cloud 404 refers to any suitable data network or combination of data networks, which may include the Internet. Client machines located in the cloud 404 may communicate with the on-demand database service environment 400 to access services provided by the on-demand database service environment 400. By way of example, client machines may access the on-demand database service environment 400 to retrieve, store, edit, and/or process various types of information.

In some implementations, the edge routers 408 and 412 route packets between the cloud 404 and other components of the on-demand database service environment 400. The edge routers 408 and 412 may employ the Border Gateway Protocol (BGP). The edge routers 408 and 412 may maintain a table of IP networks or 'prefixes', which designate network reachability among autonomous systems on the internet.

In one or more implementations, the firewall 416 may protect the inner components of the environment 400 from internet traffic. The firewall 416 may block, permit, or deny access to the inner components of the on-demand database service environment 400 based upon a set of rules and/or other criteria. The firewall 416 may act as one or more of a packet filter, an application gateway, a stateful filter, a proxy server, or any other type of firewall.

In some implementations, the core switches 420 and 424 may be high-capacity switches that transfer packets within the environment 400. The core switches 420 and 424 may be configured as network bridges that quickly route data between different components within the on-demand database service environment. The use of two or more core switches 420 and 424 may provide redundancy and/or reduced latency.

In some implementations, communication between the pods 440 and 444 may be conducted via the pod switches 432 and 436. The pod switches 432 and 436 may facilitate communication between the pods 440 and 444 and client machines, for example via core switches 420 and 424. Also or alternatively, the pod switches 432 and 436 may facilitate communication between the pods 440 and 444 and the database storage 456. The load balancer 428 may distribute workload between the pods, which may assist in improving the use of resources, increasing throughput, reducing response times, and/or reducing overhead. The load balancer 428 may include multilayer switches to analyze and forward traffic.

In some implementations, access to the database storage 456 may be guarded by a database firewall 448, which may act as a computer application firewall operating at the database application layer of a protocol stack. The database firewall 448 may protect the database storage 456 from application attacks such as structure query language (SQL) injection, database rootkits, and unauthorized information disclosure. The database firewall 448 may include a host using one or more forms of reverse proxy services to proxy traffic before passing it to a gateway router and/or may inspect the contents of database traffic and block certain content or database requests. The database firewall 448 may work on the SQL application level atop the TCP/IP stack, managing applications' connection to the database or SQL management interfaces as well as intercepting and enforcing packets traveling to or from a database network or application interface.

In some implementations, the database storage 456 may be an on-demand database system shared by many different organizations. The on-demand database service may employ a single-tenant approach, a multi-tenant approach, a virtualized approach, or any other type of database approach. Communication with the database storage 456 may be conducted via the database switch 452. The database storage 456 may include various software components for handling database queries. Accordingly, the database switch 452 may direct database queries transmitted by other components of the environment (e.g., the pods 440 and 444) to the correct components within the database storage 456.

Figure 4B:
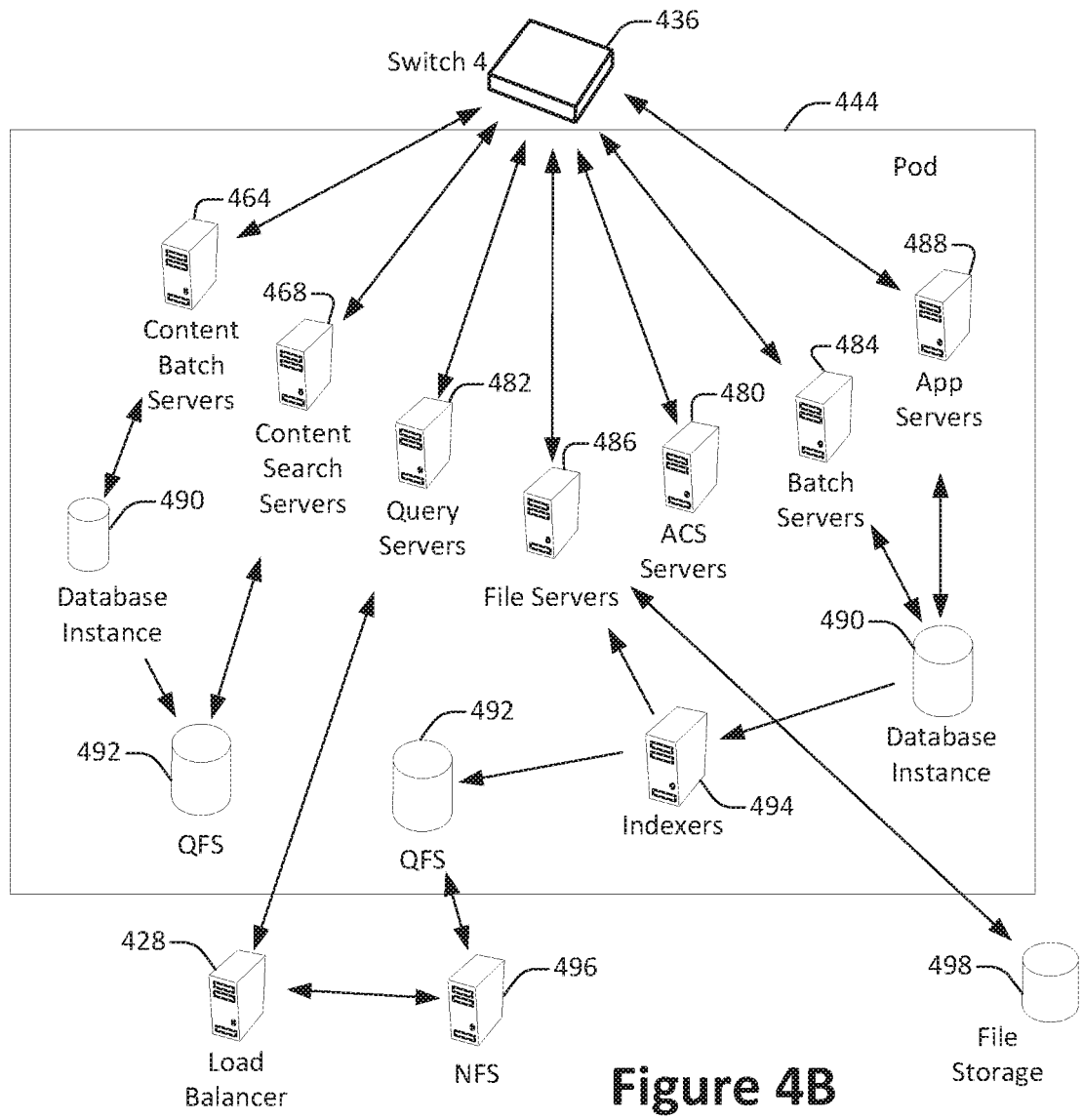
FIG. 4B shows a system diagram further illustrating an example of architectural components of an on-demand database service environment, in accordance with some implementations.

FIG. 4B shows a system diagram further illustrating an example of architectural components of an on-demand database service environment, in accordance with some implementations. The pod 444 may be used to render services to user(s) of the on-demand database service environment 400. The pod 444 may include one or more content batch servers 464, content search servers 468, query servers 482, file servers 486, access control system (ACS) servers 480, batch servers 484, and app servers 488. Also, the pod 444 may include database instances 490, quick file systems (QFS) 492, and indexers 494. Some or all communication between the servers in the pod 444 may be transmitted via the switch 436.

In some implementations, the app servers 488 may include a framework dedicated to the execution of procedures (e.g., programs, routines, scripts) for supporting the construction of applications provided by the on-demand database service environment 400 via the pod 444. One or more instances of the app server 488 may be configured to execute all or a portion of the operations of the services described herein.

In some implementations, as discussed above, the pod 444 may include one or more database instances 490. A database instance 490 may be configured as an MTS in which different organizations share access to the same database, using the techniques described above. Database information may be transmitted to the indexer 494, which may provide an index of information available in the database 490 to file servers 486. The QFS 492 or other suitable filesystem may serve as a rapid-access file system for storing and accessing information available within the pod 444. The QFS 492 may support volume management capabilities, allowing many disks to be grouped together into a file system. The QFS 492 may communicate with the database instances 490, content search servers 468 and/or indexers 494 to identify, retrieve, move, and/or update data stored in the network file systems (NFS) 496 and/or other storage systems.

In some implementations, one or more query servers 482 may communicate with the NFS 496 to retrieve and/or update information stored outside of the pod 444. The NFS 496 may allow servers located in the pod 444 to access information over a network in a manner similar to how local storage is accessed. Queries from the query servers 422 may be transmitted to the NFS 496 via the load balancer 428, which may distribute resource requests over various resources available in the on-demand database service environment 400. The NFS 496 may also communicate with the QFS 492 to update the information stored on the NFS 496 and/or to provide information to the QFS 492 for use by servers located within the pod 444.

In some implementations, the content batch servers 464 may handle requests internal to the pod 444. These requests may be long-running and/or not tied to a particular customer, such as requests related to log mining, cleanup work, and maintenance tasks. The content search servers 468 may provide query and indexer functions such as functions allowing users to search through content stored in the on-demand database service environment 400. The file servers 486 may manage requests for information stored in the file storage 498, which may store information such as documents, images, basic large objects (BLOBs), etc. The query servers 482 may be used to retrieve information from one or more file systems. For example, the query system 482 may receive requests for information from the app servers 488 and then transmit information queries to the NFS 496 located outside the pod 444. The ACS servers 480 may control access to data, hardware resources, or software resources called upon to render services provided by the pod 444. The batch servers 484 may process batch jobs, which are used to run tasks at specified times. Thus, the batch servers 484 may transmit instructions to other servers, such as the app servers 488, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 5:
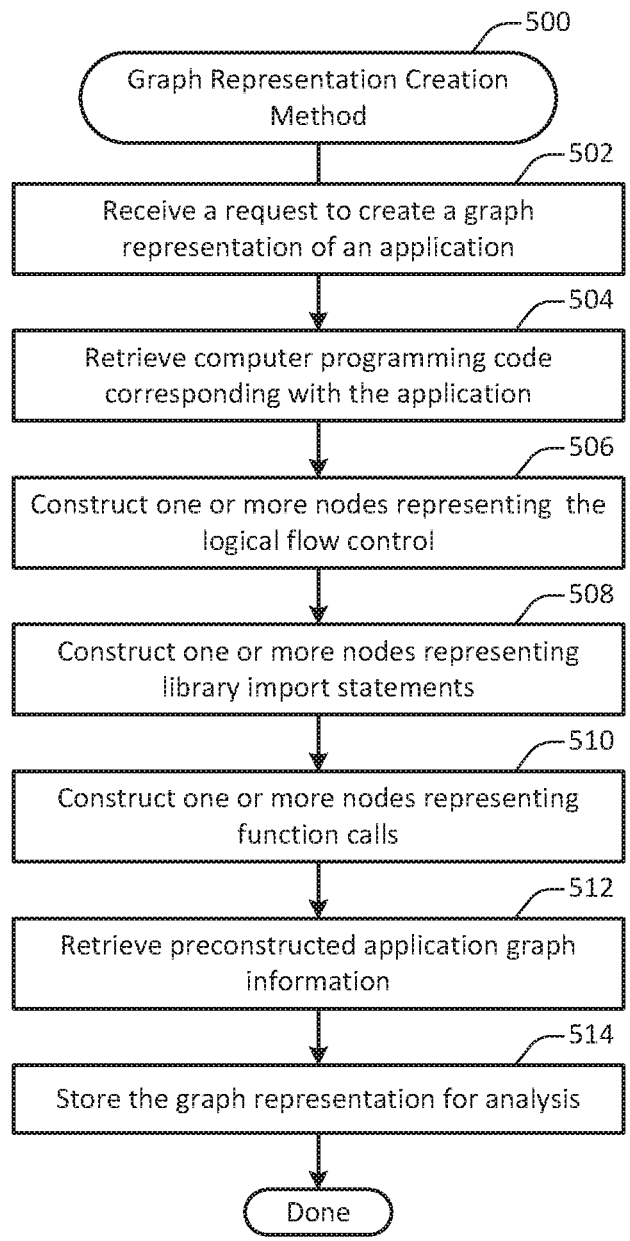
FIG. 5 illustrates a method for performing a graph representation, performed in accordance with one or more embodiments.

FIG. 5 illustrates a method 500 for creating a graph representation, performed in accordance with one or more embodiments. In some implementations, the method 500 may be performed at a component of an on-demand computing services system. For example, the method 500 may be performed at the scoring engine 250 shown in FIG. 2.

Figure 6:
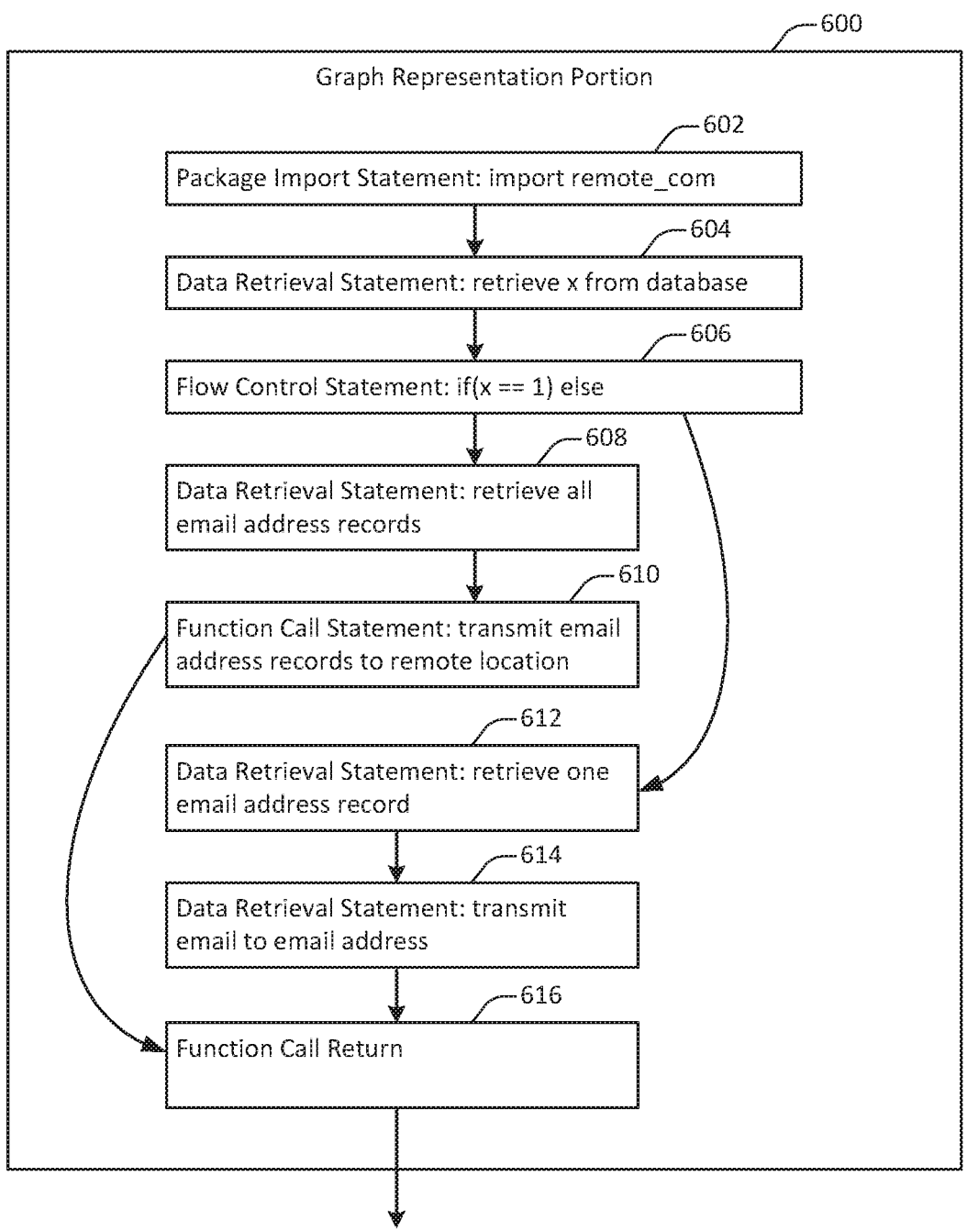
FIG. 6 illustrates a graph representation portion, configured in accordance with one or more embodiments.

FIG. 6 illustrates a graph representation portion 600, configured in accordance with one or more embodiments. The method 500 will be described partially in reference to the graph representation portion 600 shown in FIG. 6. The graph representation 600 shown in FIG. 6 is a depiction of a portion of a graph representation that has been simplified for the purposes of illustration. Graph representations of applications may take various forms depending on, for instance, characteristics of the programming language being represented.

At 502, a request is received to create a graph representation of an application. According to various embodiments, the request may be received as part of a process for evaluating an application for security. For example, the request may be received when a new application is added to the system. As another example, the request may be received when an existing application is updated with a new version.

In some implementations, the request may be generated automatically. For instance, the request may be generated when a designated triggering condition is detected, such as the addition of a new application. Alternately, or additionally, a request may be generated manually. For instance, a user may request the evaluation of an application purchased from a third-party application developer.

Computer programming code corresponding with the application is retrieved at 504. According to various embodiments, the computer programming code may be retrieved from a repository within the on-demand computing services environment. For example, the on-demand computing services environment may maintain a repository to store applications uploaded by end users or provided by third-party application developers.

At 506, one or more nodes representing the logical flow control of the application are constructed. According to various embodiments, the logical flow control nodes may be constructed by analyzing the application to identify programming code instructions such as "if", "for", "switch", and "while" statements. Such instructions may create potential branches in the execution of the computer programming code, with the branch to be taken determined at runtime based on information accessible to the computer programming code at runtime.

An example of a logical flow control node is shown in 606, based on the pseudo-code statement "if(x==1) else". Depending on the value of the variable "x" as determined at runtime, the code may branch either to the instruction represented by the node 608 or the instruction represented by the node 612.

According to various embodiments, as part of the creation of a node, one or more edges connecting nodes may be created as well. For example, the construction of the node 606 may involve constructing one or more of the edges between the node 606 and other nodes in the graph representation portion.

One or more nodes representing library import statements are constructed at 508. According to various embodiments, the construction of library import statement nodes may involve identifying those computer programming code statements that import code from outside the application. Such imported code may include libraries or packages of code provided by the service provider of the on-demand computing services system, by the developer of the application, by a third-party application developer, or from any suitable source.

An example of a library import statement is shown at 602 in FIG. 6. The node 602 represents an import statement that imports the library "remote_com", which in the example shown in FIG. 6 relates to communication with remote destinations outside the on-demand computing services system.

At 510, one or more nodes representing function calls are constructed. According to various embodiments, function call nodes may be constructed by identifying a function call within the computer programming code and constructing a node the identify the node that is being called.

Examples of function call nodes are shown at nodes 604, 608, 610, 612, 614, and 616 in FIG. 6. The node 604 corresponds with an instruction to retrieve the value for the variable "x" from a database. The node 608 corresponds with an instruction to retrieve from the database all contact email address records associated with the customer account running the application. The node 610 corresponds with an instruction to transmit the email address records retrieved at 608 to a remote location. The node 612 corresponds with an instruction to retrieve a designated contact email address record from the database. The node 614 corresponds with an instruction to transmit an email to the email address retrieved at operation 612. The node 616 corresponds with an instruction to return from the function that encapsulates the graph representation portion 600.

Preconstructed application graph information is retrieved at 512. According to various embodiments, application graph portions may be preconstructed for packages and functions accessible within the on-demand computing services environment. For example, when a library is imported, an application graph portion associated with the library may be retrieved as well. As another example, a preconstructed application graph portion may be retrieved for function calls made to functions within such libraries. As yet another example, a preconstructed application graph portion may be retrieved for a function call internal to the application when that function has already been processed.

In some implementations, a preconstructed application graph portion may be incorporated within or linked to from the graph for the focal application. That is, a graph representation may be individual or chained. For example, a function call associated with the application graph may link to a respective function graph representation. For example, in FIG. 6, any or all of the nodes 604, 608, 610, 612, 614, and 616 may link to, or be replaced by, a different graph representation portion associated with the respective function call.

The graph representation is stored for analysis at 514. According to various embodiments, the graph representation may be stored at any suitable location within the on-demand computing services environment. For example, the graph representation may be stored in a repository accessible to the scoring engine 250 shown in FIG. 2. The graph representation may be analyzed by an analysis method such as the method 700 shown in FIG. 7.

In some embodiments, one or more of the operations shown in FIG. 5 may be performed in parallel and/or in an order different than that shown. For example, the instructions in an application may be analyzed in sequence or in parallel to construct the graph. As another example, different portions of an application may be analyzed in parallel, with the resulting graph representation portions then combined after construction.

In some embodiments, the construction of a graph representation method may involve operations other than that shown in FIG. 5. For example, nodes may be constructed corresponding to statements such as variable assignments or other types of instructions.

In some embodiments, one or more operation shown in FIG. 5 need not necessarily be performed. For instance, an application may be analyzed internally without retrieving preconstructed application graph information at operation 512.

Figure 7:
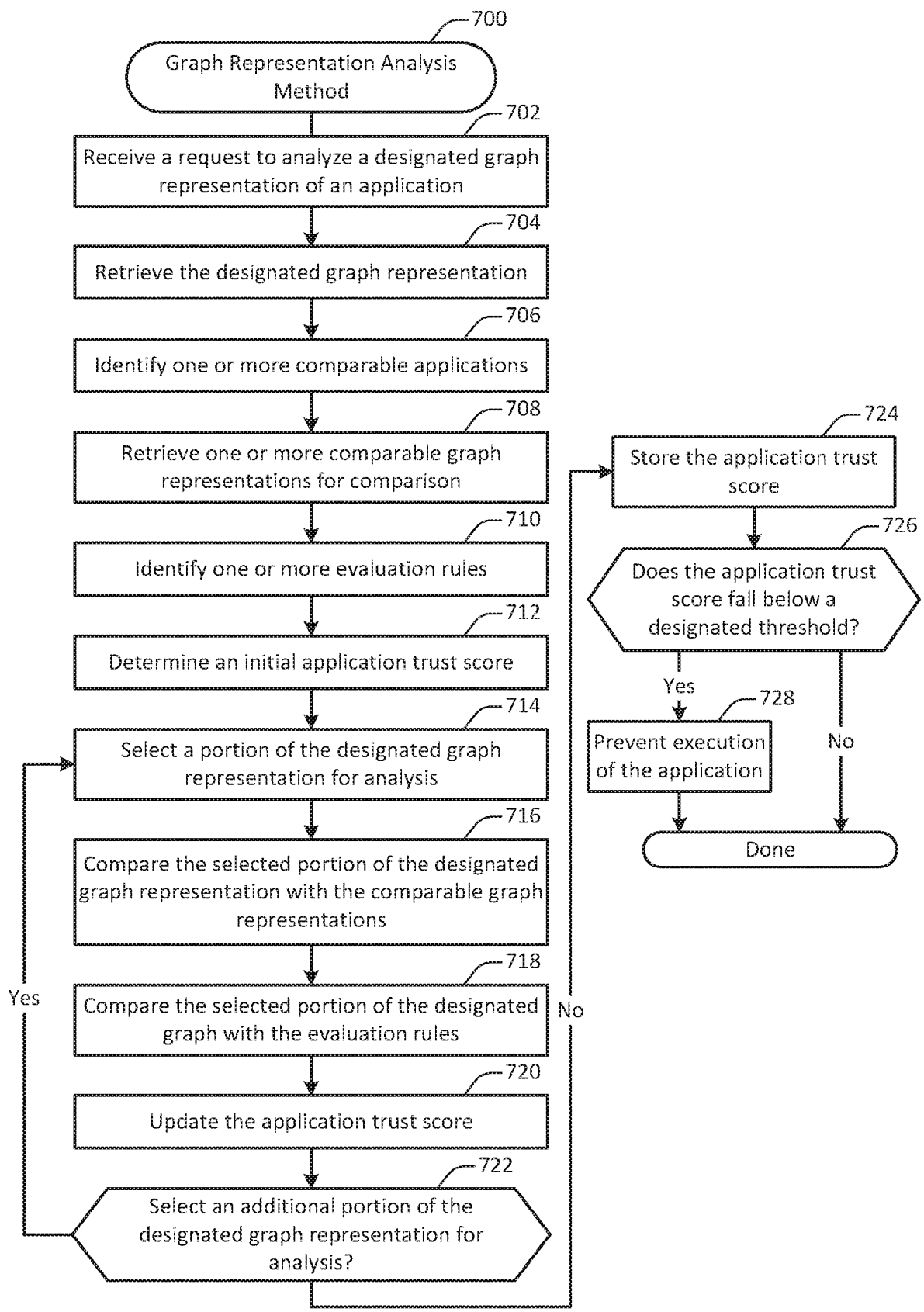
FIG. 7 illustrates a method for analyzing a graph representation, performed in accordance with one or more embodiments.

FIG. 7 illustrates a method 700 for analyzing a graph representation, performed in accordance with one or more embodiments. According to various embodiments, the method 700 may be performed at one or more computing components within an on-demand computing services environment. For example, the method 700 may be performed at the scoring engine 250 shown in FIG. 2.

At 702, a request to analyze a designated graph representation of an application is received. In some embodiments, the request may be generated as part of a security review of the application. For example, an application may be reviewed when it is first added to the system or when it is updated. As another example, an application may be reviewed when it is used by a designated number of clients. As yet another example, an application may be reviewed when it is designated for review by a user such as an administrator.

The designated graph representation is retrieved at 704. In some implementations, the designated graph representation may be retrieved from a storage repository where it was stored upon construction at operation 512 shown in FIG. 5.

One or more comparable applications are identified at 706. Comparable applications may be identified in any of a number of suitable ways. In some embodiments, comparable applications may include previous versions of the designated applications. In this way, the current state of the designated application may be compared with past states of the designated application.

In some embodiments, comparable applications may other applications configured to perform related tasks. For example, comparable applications may include other applications within the same on-demand computing services environment. As another example, comparable applications may include other applications configured to perform tasks similar to the designated application. As yet another example, comparable applications may include other applications of similar length or complexity.

In particular embodiments, comparable applications may include applications known to include or not include malicious code. Such sample applications may be used as a basis of comparison when searching for malicious code within the designated application.

One or more comparable graph representations are retrieved for comparison at 708. According to various embodiments, each comparable graph representation may correspond to an application identified at 706. If a comparable application is associated with a graph representation that has already been constructed, then the graph representation may be retrieved as discussed with respect to 702. If instead the comparable application is not associated with a graph representation, then a graph representation may be constructed for the comparable application as discussed with the method 500 shown in FIG. 5.

One or more evaluation rules are identified at 710. According to various embodiments, each evaluation rule may define one or more characteristics indicative of computer programming code likely to constitute a security risk. In some configurations, such a rule may be constructed automatically, for instance based on previous analysis of graph representations of applications. Alternately, or additionally, one or more rules may be specified by a user. For instance, a user may indicate that the detection of one or more of a list of designated computer programming code instructions indicates an application likely to be malicious.

In some embodiments, a variety of rules are possible. For example, a violation of explicit permissions may indicate a high probability of malicious code. As another example, a number of data read requests in excess of a designated threshold may indicate a high probability of malicious code.

An initial application trust score is determined at 712. In some embodiments, the initial application trust score may simply be a default value used for all applications. Alternately, the initial application trust score may be set based on contextual characteristics of the application. For instance, an application developed by a developer with a long history of application development may start with a relatively higher application trust score than an application developed by a new developer.

In some implementations, the application trust score may be implemented as a numerical value. For instance, the application trust score may be implemented as a probability that the application is trustworthy. Alternately, the application trust score may be implemented as a categorical variable, with values such as "high", "medium", and "low."

At 714, a portion of the designated graph representation is selected for analysis. According to various embodiments, portions of the designated graph representation may be analyzed sequentially, in parallel, or in any suitable order. Each portion of the designated graph representation may include one or more computer programming code statements. For example, a portion may include a single statement or may include a collection of related statements.

In some embodiments, related statements may be identified based on code characteristics such as common location within a function, within control code scope, or within other such units of execution. Alternately, or additionally, related statements may be identified based on references to common variables, functions, classes, or libraries.

At 716, the selected portion of the designated graph representation is compared with the comparable graph representations retrieved at 708. According to various embodiments, the comparison may involve any suitable operation for determining whether the selected portion includes malicious code. For example, the comparison may involve comparing the selected portion to portions of comparison graph representations that are either known to be malicious, known to not be malicious, or believed to not be malicious.

In some embodiments, various types of comparisons may be performed in an effort to identify malicious code. For example, a determination may be made as to whether the selected portion includes one or more programming code statements included or not included in one or more of the comparison graph representations. As another example, a determination may be made as to whether the selected portion retrieves a larger or smaller amount of data than that retrieved in the comparison graph representations. As yet another example, a determination may be made as to whether the selected portion includes more or less communication with recipients outside the on-demand service environment than comparison graph representations. As still another example, a determination may be made as to whether the selected portion includes greater or fewer data update statements updating data within the on-demand service environment.

The selected portion of the designated graph is compared with the evaluation rules at 718. In some embodiments, the comparison of the selected portion with the evaluation rules may involve evaluating one or more criteria specified by an evaluation rule. For example, an evaluation rule may include as a criterion the presence of a computer programming code statement that retrieves all data records of a given type from the database. As another example, an evaluation rule may include as a criterion the presence of computer programming code that dynamically determines the identity of a package, class, or function at runtime. Such criteria may be applied to the selected portion to determine whether the selected portion is likely to include malicious code.

According to various embodiments, the comparisons and evaluations discussed herein may involve making a determination as to whether the selected portion is abnormal or unusual when compared with comparable representations known or believed to not be malicious. Alternately, or additionally, the comparisons and evaluations discussed herein may involve making a determination as to whether the selected portion is similar to comparable representations known or believed to be malicious. Because computer programming code is infinitely variable, a wide range of suitable criteria may be used. Such criteria may be strategically determined based on characteristics such as the computing environment in which the code is executed, the nature of the computer programming language in which the code is written, and the types of data operated on and/or operations performed by the application.

According to various embodiments, the comparisons and evaluations discussed herein may be performed via any suitable comparison framework. Such frameworks may include, but are not limited to: machine learning frameworks, probabilistic models, regression models, and heuristic decision models.

In some implementations, the comparisons made when comparing within versions of the same application and when comparing across different applications may be substantially similar. Alternately, different types of comparisons may be performed in these different contexts. For example, when an application is compared with its own prior versions, the comparisons may involve evaluating parameter values, function calls, and imported libraries. When instead an application is compared with other applications in the same organization or on-demand service environment, the comparisons may involve baseline levels of data access and other characteristics between these applications.

The application trust score is updated at 720. In some embodiments, updating the application trust score may involve any operation for including the result of one or more of the comparisons performed at 716 and 718 in the score. For example, if one or both of the comparisons performed at 716 and 718 indicate that the selected portion includes potentially problematic instructions, then the score may be increased.

In some embodiments, the detection of designated types of problems may increase the score to at or near the maximum value. For example, the score may be implemented as a percentage probability that the application includes security problems. In such a configuration, the detection of code that is highly likely to constitute a security threat may cause the score to be increased substantially.

A determination is made at operation 722 as to whether to select an additional portion of the designated graph representation for analysis. In some implementations, additional portions of the designated graph representation are selected for analysis until all portions of the application have been analyzed. Alternately, when the application trust score falls below a designated threshold, then further analysis may be unnecessary. In some configurations, not every portion of the graph representation need be analyzed. For example, graph representation portions may be selected for analysis at random, or may be selected based on a preliminary scoring. For instance, the presence of particular function calls, parameter values, or other such characteristics may indicate that a graph representation portion is more or less likely to include malicious code.

The application trust score is stored at 724. According to various embodiments, the application trust score may be stored in any suitable location within the on-demand computing services environment. The application trust store may be stored so that it may be reviewed at a later time. In some configurations, the application trust score for a previous version of the application may be used to determine an initial application trust score for a subsequent version of the same application.

A determination is made at 726 as to whether the application trust score falls below a designated threshold. In some embodiments, the designated threshold may be shared by all applications. Alternately, the designated threshold may be specific to particular types of applications.

In some implementations, the designated threshold may be determined automatically, for instance by analyzing applications that are known to include malicious code. The application trust scores for these sample malicious applications may then be compared to application trust scores for sample applications known not to be malicious to determine a suitable designated threshold.

When it is determined that the application trust score falls below the designated threshold, execution of the application is prevented at 728. According to various embodiments, preventing the execution of the application may involve transmitting a message indicating that new instances of the application should not be created. In some configurations, existing instances of the applications may be terminated as well.

Although method 700 is described as being used to detect security-related issues, a variety of other issues may be detected instead of, or in addition to, security-related issues. For example, the scoring engine may determine that an application is configured to unexpectedly and repeatedly execute the same instructions or instructions. From this behavior, the scoring engine may determine that the application is likely to become stuck in an infinite loop and therefore transmit an instruction to prevent the application from being executed even though no security-related issues have been detected. As another example, the unexpected retrieval of a large amount of data may indicate a programming error rather than malicious code. Nevertheless, the scoring engine may prevent the application from being executed upon the detection of such conditions. Other types of errors that may be detected may include, but are not limited to: race conditions, unreachable code, incorrect variable names, and other such problems.

Figure 8:
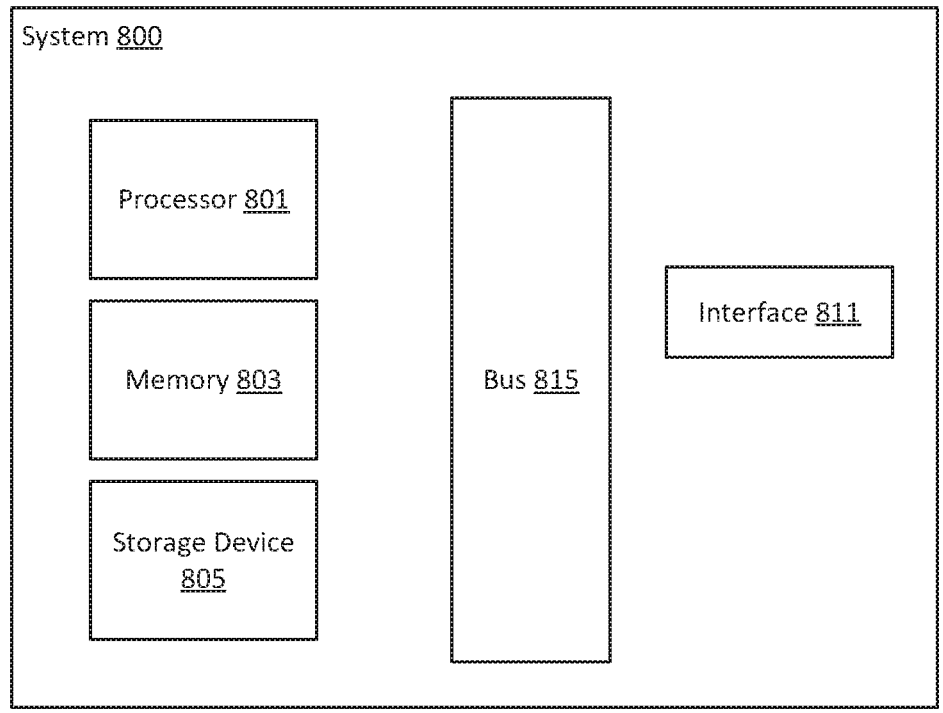
FIG. 8 illustrates an example of a server, configured in accordance with one or more embodiments.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
creating a designated graph representation of a designated application stored in a memory module, the designated graph representation including a plurality of nodes and a plurality of edges connecting the nodes, each of the nodes representing a computer programming code statement associated with the designated application, each of the edges representing a logical linkage between a respective two or more computer programming code statements associated with the designated application, wherein a first node represents an "if" statement, wherein the first node is connected via a first directional edge to a second node that represents a first statement to be executed if the "if" statement returns "True", wherein the first node is connected via a second directional edge to a third node that represents a second statement to be executed if the "if" statement returns "False";

determining via a processor whether the designated application constitutes a security risk by comparing the designated graph representation with a plurality of comparison graph representations stored within a storage repository within an on-demand computing services environment providing computing services to a plurality of client organizations, a designated-subset of the comparison graph representations each representing a respective portion of computer programming code identified as malicious, each of the comparison graph representations being associated with a respective comparison application, each comparison involving identifying one or more differences between nodes and edges in the designated graph representation and nodes and edges in the comparison graph representation, wherein determining whether the designated application constitutes a security risk comprises determining whether the designated graph representation includes one or more statements not present in the comparison graph representations; and when it is determined that the designated application constitutes a security risk, transmitting a message from a communications interface to prevent the designated application from being executed.

2. The method recited in claim 1, wherein the comparison applications include two or more prior versions of the designated application.

3. The method recited in claim 1, wherein determining whether the designated application constitutes a security risk comprises determining whether the designated graph representation includes one or more statements not present in the comparison graph representations corresponding with the prior versions of the designated application.

4. The method recited in claim 1, wherein determining whether the designated application constitutes a security risk comprises determining whether the designated graph representation includes one or more nodes corresponding with respective computer programming code statements to transmit information outside the on-demand computing services system.

5. The method recited in claim 1, wherein determining whether the designated application constitutes a security risk comprises determining whether the designated graph representation includes one or more nodes corresponding with respective computer programming code statements to update information stored within the on-demand computing services system.

6. The method recited in claim 1, wherein determining whether the designated application constitutes a security risk comprises determining whether the designated graph representation includes one or more nodes corresponding with respective computer programming code statements to update information retrieved from the on-demand computing services system.

7. The method recited in claim 1, wherein the designated application is authored by one of the client organizations.

8. The method recited in claim 1, wherein the designated application is authored by a third-party software developer to the on-demand computing services environment.

9. The method recited in claim 1, wherein each of the comparison applications is configured to access information stored within a multi-tenant database in the on-demand computing services environment, the multi-tenant database storing information associated with the plurality of client organizations.

10. The method recited in claim 1, wherein the comparison applications are accessible via an application exchange, the application exchange providing applications for purchase via a network.

11. A computing device comprising:
a storage medium configurable to store a designated graph representation created to represent a designated application, the designated graph representation including a plurality of nodes and a plurality of edges connecting the nodes, each of the nodes representing a computer programming code statement associated with the designated application, each of the edges representing a logical linkage between a respective two or more computer programming code statements associated with the designated application, wherein a first node represents an "if" statement, wherein the first node is connected via a first directional edge to a second node that represents a first statement to be executed if the "if" statement returns "True", wherein the first node is connected via a second directional edge to a third node that represents a second statement to be executed if the "if" statement returns "False";
a processor configurable to determine whether the designated application constitutes a security risk by comparing the designated graph representation with a plurality of comparison graph representations stored within a storage repository within an on-demand computing services environment providing computing services to a plurality of client organizations, a designated-subset of the comparison graph representations each representing a respective portion of computer programming code identified as malicious, each of the comparison graph representations being associated with a respective comparison application, each comparison involving identifying one or more differences between nodes and edges in the designated graph representation and nodes and edges in the comparison graph representation, wherein determining whether the designated application constitutes a security risk comprises determining whether the designated graph representation includes one or more statements not present in the comparison graph representations; and
a communications interface configurable to transmit a message to prevent the designated application from being executed when it is determined that the designated application constitutes a security risk.

12. The computing device recited in claim 11, wherein the comparison applications include two or more prior versions of the designated application.

13. The computing device recited in claim 11, wherein determining whether the designated application constitutes a security risk comprises determining whether the designated graph representation includes one or more statements not present in the comparison graph representations corresponding with the prior versions of the designated application.

14. The computing device recited in claim 11, wherein determining whether the designated application constitutes a security risk comprises determining whether the designated graph representation includes one or more nodes corresponding with respective computer programming code statements to transmit information outside the on-demand computing services system.

15. The computing device recited in claim 11, wherein determining whether the designated application constitutes a security risk comprises determining whether the designated graph representation includes one or more nodes corresponding with respective computer programming code statements to update information stored within the on-demand computing services system.

16. The computing device recited in claim 11, wherein determining whether the designated application constitutes a security risk comprises determining whether the designated graph representation includes one or more nodes corresponding with respective computer programming code statements to update information retrieved from the on-demand computing services system.

17. One or more non-transitory computer readable media having instructions stored thereon for performing a method, the method comprising:
creating a designated graph representation of a designated application stored in a memory module, the designated graph representation including a plurality of nodes and a plurality of edges connecting the nodes, each of the nodes representing a computer programming code statement associated with the designated application, each of the edges representing a logical linkage between a respective two or more computer programming code statements associated with the designated application, wherein a first node represents an "if" statement, wherein the first node is connected via a first directional edge to a second node that represents a first statement to be executed if the "if" statement returns "True", wherein the first node is connected via a second directional edge to a third node that represents a second statement to be executed if the "if" statement returns "False";
determining via a processor whether the designated application constitutes a security risk by comparing the designated graph representation with a plurality of comparison graph representations stored within a storage repository within an on-demand computing services environment providing computing services to a plurality of client organizations, a designated-subset of the comparison graph representations each representing a respective portion of computer programming code identified as malicious, each of the comparison graph representations being associated with a respective comparison application, each comparison involving identifying one or more differences between nodes and edges in the designated graph representation and nodes and edges in the comparison graph representation, wherein determining whether the designated application constitutes a security risk comprises determining whether the designated graph representation includes one or more statements not present in the comparison graph representations; and
when it is determined that the designated application constitutes a security risk, transmitting a message from a communications interface to prevent the designated application from being executed.

* * * * *